(12) United States Patent
Lumini (10) Patent No.: US 12,388,225 B2
(45) Date of Patent: Aug. 12, 2025

(54) ROTATING CONNECTION PORTS IN A COMPUTING DEVICE

(71) Applicant: Microsoft Technology Licensing, LLC, Redmond, WA (US)

(72) Inventor: Teresa Francesca Lumini, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 65 days.

(21) Appl. No.: 17/924,096

(22) PCT Filed: May 7, 2021

(86) PCT No.: PCT/US2021/031355
§ 371 (c)(1),
(2) Date: Nov. 8, 2022

(87) PCT Pub. No.: WO2021/226497
PCT Pub. Date: Nov. 11, 2021

(65) Prior Publication Data
US 2023/0275380 A1    Aug. 31, 2023

(30) Foreign Application Priority Data

May 8, 2020   (NL) ..................... 2025528

(51) Int. Cl.
*H01R 35/00* (2006.01)
*H01R 35/04* (2006.01)
(52) U.S. Cl.
CPC ......... *H01R 35/04* (2013.01); *H01R 2201/06* (2013.01)

(58) Field of Classification Search
CPC ..................... H01R 35/04; H01R 2201/06
See application file for complete search history.

(56) References Cited

U.S. PATENT DOCUMENTS

| 4,592,605 | A |   | 6/1986 | Kapler |              |
|-----------|---|---|--------|--------|--------------|
| 5,545,057 | A | * | 8/1996 | Tan    | H01R 12/737  |
|           |   |   |        |        | D13/154      |

(Continued)

FOREIGN PATENT DOCUMENTS

CN     200962179 Y    10/2007
CN     107191754 B    12/2018

(Continued)

OTHER PUBLICATIONS

"Search Report and Written Opinion Issued in Netherlands Patent Application No. N2025528", Mailed Date: Mar. 9, 2021, 10 Pages.

(Continued)

*Primary Examiner* — Phuong Chi Thi Nguyen
(74) *Attorney, Agent, or Firm* — Ray Quinney & Nebeker P.C.; Paul N. Taylor (57) ABSTRACT

A computing device includes a housing, an electronic component positioned in the housing, a stand supporting the housing, and a connection port. The connection port is in electrical communication with the electronic component. The housing has an outer surface, and the connection port is moveable relative to the housing to change a port angle of the connection port relative to the outer surface of the housing when a housing angle of the housing changes relative to the stand.

16 Claims, 6 Drawing Sheets (56) References Cited

U.S. PATENT DOCUMENTS

| | | | |
|---|---|---|---|
| 6,162,071 A * | 12/2000 | Muller | H02G 3/18 |
| | | | 439/142 |
| 6,268,997 B1 | 7/2001 | Hong | |
| 6,396,687 B1 | 5/2002 | Sun et al. | |
| 6,483,709 B1 * | 11/2002 | Layton | H05K 7/1454 |
| | | | 361/788 |
| 6,533,599 B1 * | 3/2003 | Singleton, Jr. | G06F 1/1632 |
| | | | 361/679.43 |
| 6,549,416 B2 * | 4/2003 | Sterner | G06F 1/1632 |
| | | | 361/801 |
| 9,743,542 B2 | 8/2017 | Heo et al. | |
| 2009/0242233 A1 | 10/2009 | Ueda | |
| 2023/0275380 A1 * | 8/2023 | Lumini | G06F 1/1601 |
| | | | 439/131 |

FOREIGN PATENT DOCUMENTS

| | | |
|---|---|---|
| EP | 1513046 A2 | 3/2005 |
| EP | 3457248 A1 | 3/2019 |
| GB | 674434 A | 6/1952 |
| KR | 20010027292 A | 4/2001 |
| KR | 20030061171 A | 7/2003 |

OTHER PUBLICATIONS

"International Search Report and Written Opinion Issued in PCT Application No. PCT/US21/031355", Jul. 9, 2021, 12 Pages.

* cited by examiner

ROTATING CONNECTION PORTS IN A COMPUTING DEVICE

BACKGROUND

Background and Relevant Art

A computing device includes one or more connection ports to allow the connection of cables or wires between the computing device and a power supply, input devices, video displays, storage devices, audio output components, other peripheral devices, and other external resources, such as network communications. The connection ports are conventionally located on a rear surface or a bottom surface of the computing device to hide the connection ports from the user's line of sight during use of the computing device while maintaining accessibility to the connection ports. When the housing of the computing device is moved relative to a stand or table surface, the connection ports move with the housing, resulting in damage to the cables, wires, or peripherals inserted in the connection ports.

BRIEF SUMMARY

In some embodiments, a computing device includes a housing, an electronic component positioned in the housing, a stand supporting the housing, and a connection port. The connection port is in electrical communication with the electronic component. The housing has an outer surface, and the connection port is moveable relative to the housing to change a port angle of the connection port relative to the outer surface of the housing when a housing angle of the housing changes relative to the stand.

In some embodiments, a computing device includes a gear mechanism to rotate the connection port relative to the housing proportionately to a movement of the housing relative to the stand.

In some embodiments, a computing device includes a weighted orientation mechanism to rotate the connection port relative to the housing relative to the direction of gravity.

In some embodiments, a computing device includes a port hub that is moveable relative to the housing to change a port angle of the port hub relative to the outer surface of the housing when the housing changes relative to the stand.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale.

Understanding that the drawings depict some example embodiments, the embodiments will be described and explained with additional specificity and detail through the use of the accompanying drawings in which:

FIG. 1-1 is a perspective view of a conventional computing device, according to at least one embodiment of the present disclosure;

FIG. 1-2 is a side view of the computing device of FIG. 1-1, according to at least one embodiment of the present disclosure;

FIG. 2-1 is a perspective view of a computing device, according to at least one embodiment of the present disclosure;

FIG. 2-2 is a side view of the computing device of FIG. 2-1 in a reading posture, according to at least one embodiment of the present disclosure;

FIG. 2-3 is a side view of the computing device of FIG. 2-1 in a drafting posture, according to at least one embodiment of the present disclosure;

FIG. 7-1 is a side view of another computing device in a reading posture, according to at least one embodiment of the present disclosure;

FIG. 7-2 is a side view of the computing device of FIG. 7-1 in a drafting posture, according to at least one embodiment of the present disclosure;

FIG. 9-1 is a side view of a computing device with a belt drive in a reading posture, according to at least one embodiment of the present disclosure; and FIG. 9-2 is a side view of the computing device of FIG. 9-1 in a drafting posture, according to at least one embodiment of the present disclosure.

DETAILED DESCRIPTION

Figure 11:
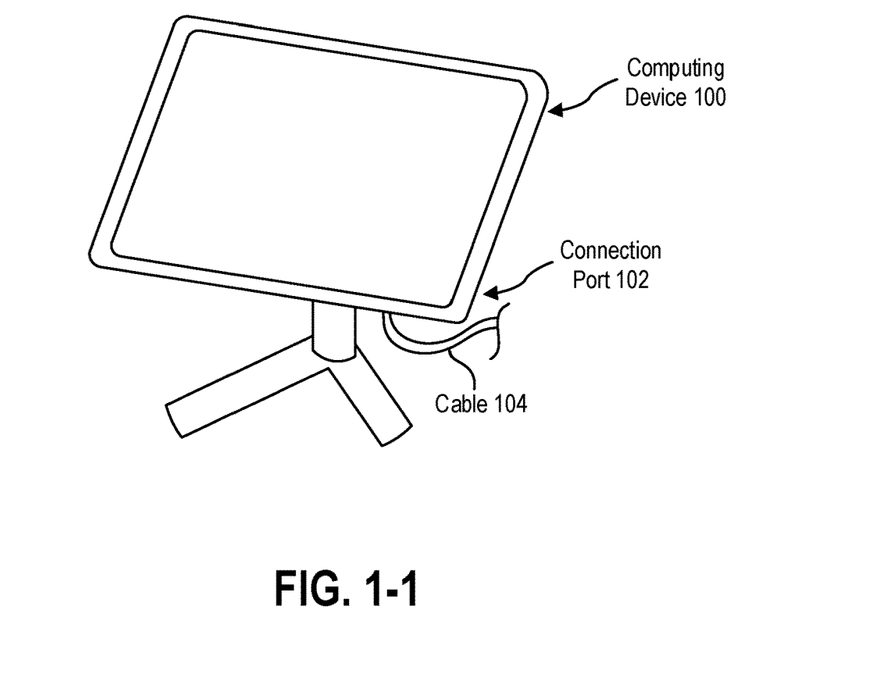
Figure 12:
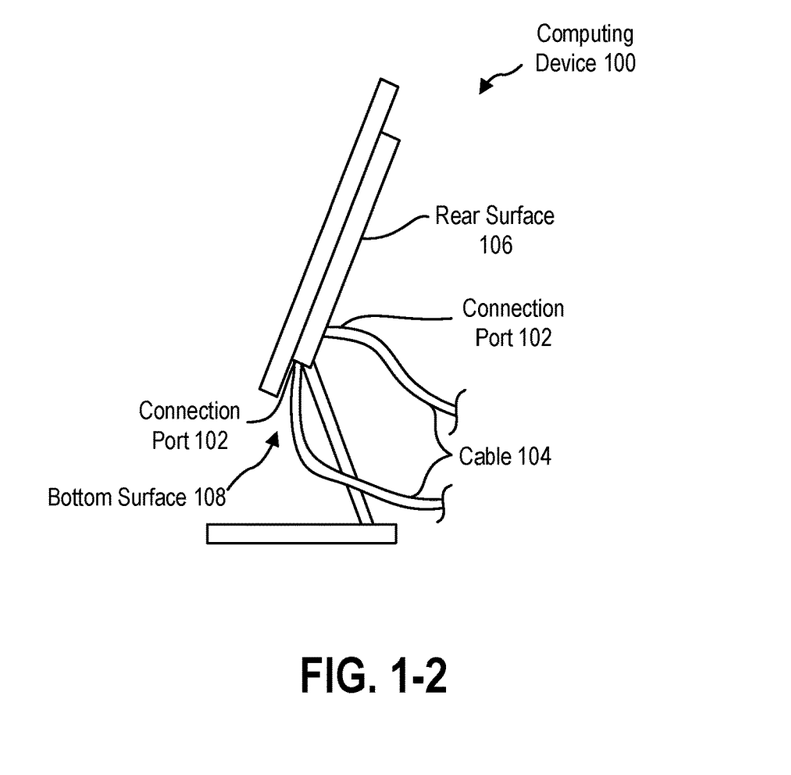

The present disclosure relates generally to systems and methods for providing moveable input/output (I/O) ports on a computing device. More particularly, the present disclosure relates to rotating I/O ports on a desktop computer, an all-in-one (AIO) computer, laptop computer, hybrid computer, or a display monitor for a desktop computer (collectively "computing devices"). As shown in FIGS. 1-1 and 1-2, a computing device 100 can include one or more connection ports 102 to allow the connection of cables 104 or wires between the computing device 100 and a power supply, input devices, video displays, storage devices, audio output components, other peripheral devices, and other external resources, such as network communications. The connection ports 102 are conventionally located on a rear surface 106 or a bottom surface 108 of the computing device 100 to hide the connection ports 102 from the user's line of sight during use of the computing device 100 while maintaining accessibility to the connection ports 102.

Figure 21:
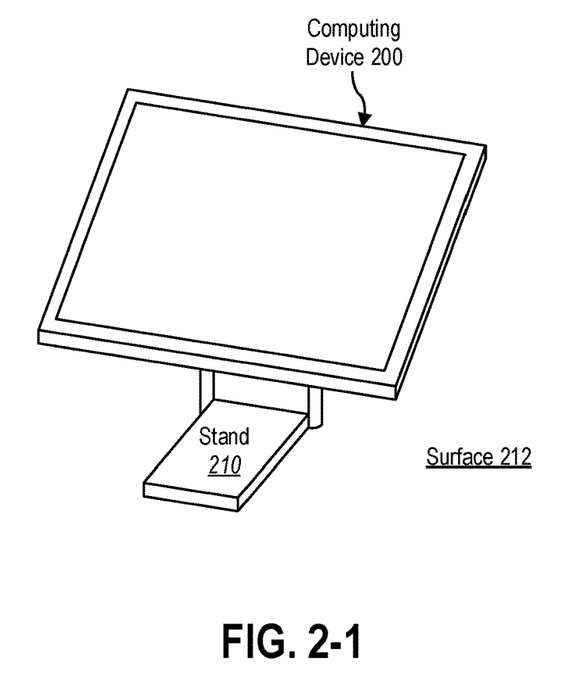
Figure 22:
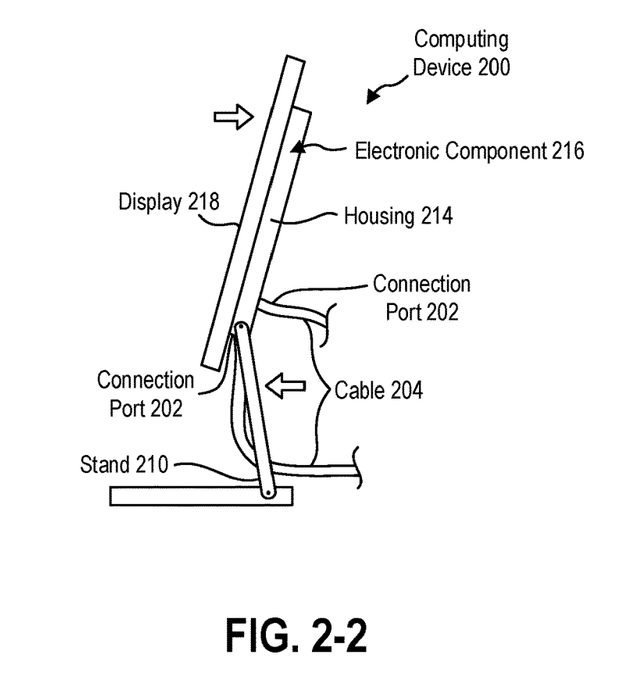
Figure 23:
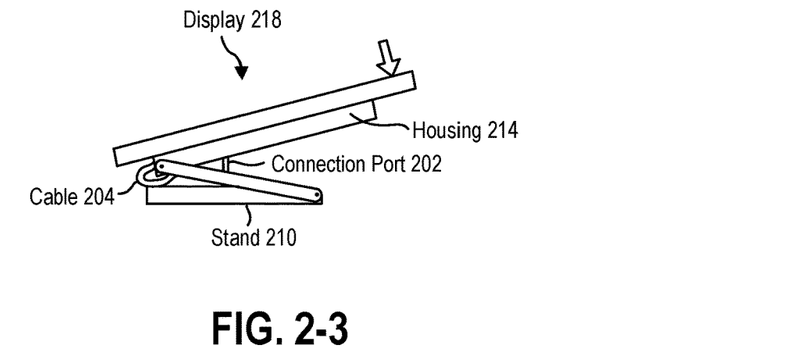

In some embodiments, the computing device containing the I/O ports is moveable relative to a surface upon which the computing device rests. In some embodiments, the computing device containing the I/O port is movable relative to a stand, which supports the computing device on a surface. FIG. 2-1 through 2-3 illustrate an embodiment of a computing device 200 that is moveable between a reading posture, shown in FIG. 2-2, and a drafting posture, shown in FIG. 2-3. The movement of the computing device 200 relative to the stand 210 and/or surface 212 upon which the computing device 200 and/or stand 210 rests can pinch, impinge, torque, or otherwise stress the cables 204 or wires connected to the connection ports 202. In some embodiments according to the present disclosure, a computing device 200 includes a rotatable I/O port, connection port, or port hub that is moveable relative to a housing 214 of the computing device 200.

In some embodiments, the rotatable I/O port, connection port 202, or port hub rotates relative to the housing 214 of the computing device 200 to provide a wired communication to one or more electronic components 216 positioned in the housing 214. The rotatable I/O port, connection port 202, or port hub allows the connection of a cable 204 or wire to the computing device 200 with a range of motion relative to a surface of the housing 214, which limits and/or prevents unintended disconnection of the cable 204 or wire during use and/or limits and/or prevents premature wear and/or failure of the cable 204, wire, or connection port 202.

In some embodiments, the display 218 is integrated into the housing 214 and moves with the housing 214 and other electronic components 216. In some embodiments, the user can tilt and translate the display 218 downward to enter the drafting posture shown in FIG. 2-3. In a conventional computing device that is moveable or rotatable relative to a stand or surface upon which the computing device rests, a connection port 202 or a cable 204 or wire attached to the connection port 202 can be stressed or damages when the cable 204 is pulled away from or laterally relative to the connection port 202. Additionally, the cable 204 or wire can be stressed or damaged when the cable 204 or wire is bent in small radius curves.

Figure 3:
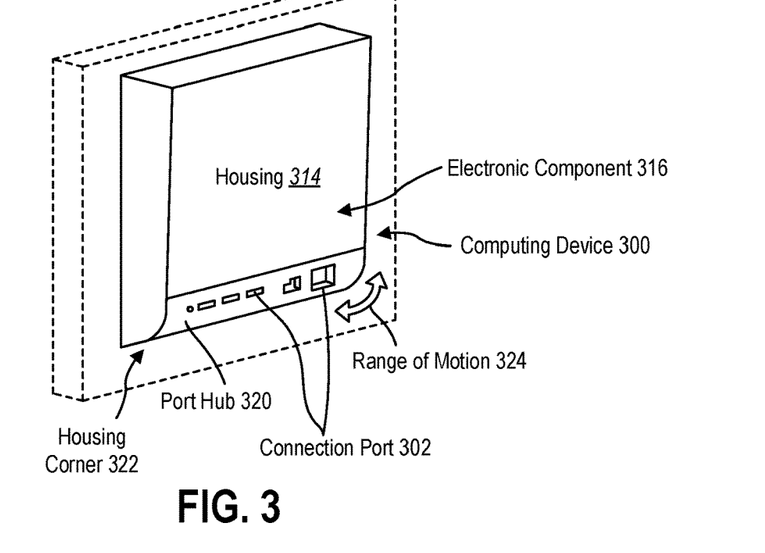
FIG. 3 is a rear perspective view of a computing device housing, according to at least one embodiment of the present disclosure.

Referring now to FIG. 3, in some embodiments, a rotatable connection port 302 or port hub 320 can allow the cable or wire to remain in a favorable orientation and/or routing path away from the computing device. In some embodiments, the connection port 302 is the I/O port of the electronic component 316 in the housing 314 of the computing device 300. In some embodiments, the connection port 302 is in wired communication with the I/O port of the electronic component 316. For example, the actual I/O port of the electronic component 316 may be located in the center of a circuit board or near another electronic component 316 that is inconvenient or not possible to access with the cable or wire. In some embodiments, a connection port 302 or port hub 320 is located at a corner 322 of the housing 314 of a computing device 300, such that rotation of the connection port 302 relative to the housing 314 allows a larger range of motion 324.

In some embodiments, connection port 302 is part of a port hub 320 with a plurality of connection ports 302 located therein. In some embodiments, the connection port 302 and/or port hub 320 includes a connection for a power supply port, a network communication port (e.g., an ethernet port), a universal serial bus (USB) port (e.g., USB-A, USB-B, USB-C, miniUSB, microUSB), an audio port (e.g., 3.5 millimeter jack), DisplayPort, Thunderbolt port, optical port, or another type of connection port from which a wire, a cable, or another peripheral protrudes when connected. While cables and/or wires are flexible, some peripherals, such as USB memory drives, rigidly project from the connection port 302 when connected.

Figure 4:
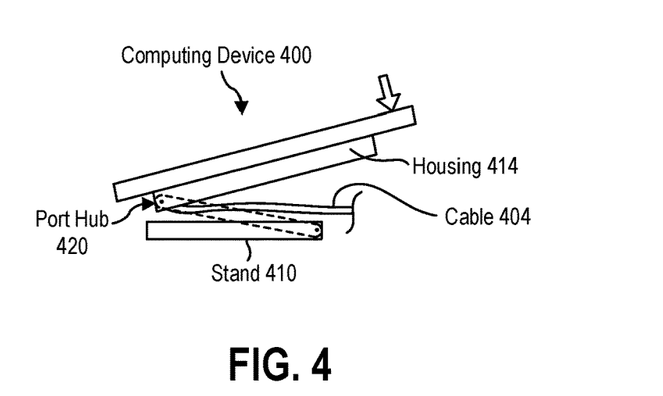
FIG. 4 is a side view of a computing device with a rotatable connection port, according to at least one embodiment of the present disclosure.

FIG. 4 illustrates an embodiment of an AIO computing device 400 with a rotatable port hub 420. When the housing 414 is oriented nearly flat relative to the stand 410, the port hub 420 is able to rotate and orient the cable 404 backward and between the housing 414 and the surface of the stand 410.

Figure 5:
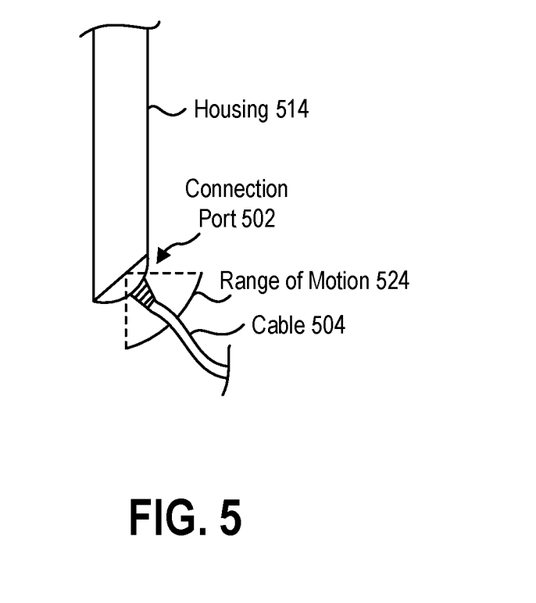
FIG. 5 is a side view of a computing device housing with a rotatable connection port, according to at least one embodiment of the present disclosure.

Referring now to FIG. 5, a rotatable connection port 502 is shown with a cable 504 inserted therein. In some embodiments, the connection port 502 has a rotational range of motion 524 greater than 45°. In some embodiments, the connection port 502 has a rotational range of motion 524 greater than 60°. In some embodiments, the connection port 502 has a rotational range of motion 524 greater than 90°. In some embodiments, the connection port 502 has a rotational range of motion 524 greater than 120°.

Figure 6:
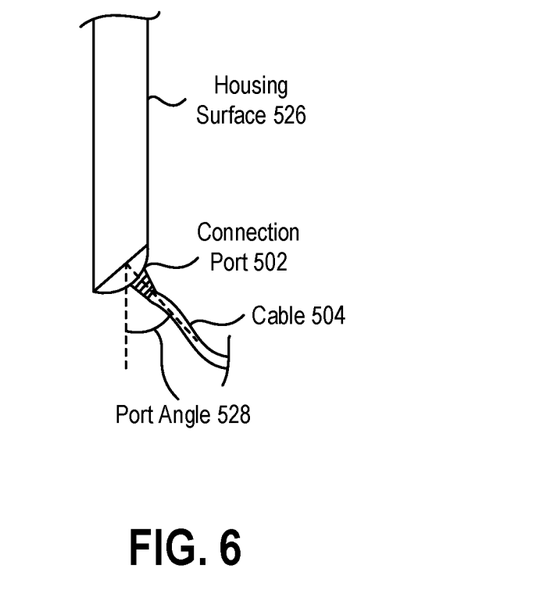
FIG. 6 is a side view of the computing device housing of FIG. 5, according to at least one embodiment of the present disclosure.

As shown in FIG. 6, the connection port(s) 502 is positionable relative to a housing surface 526 such that a cable 504, wire, or peripheral connected to the connection port(s) 502 forms a port angle 528 with the housing surface 526. In some embodiments, a minimum or maximum port angle 528 (e.g., one extent of the range of motion) is in a range having an upper value, a lower value, or upper and lower values including any of 0° (i.e., parallel with the housing surface), 10°, 20°, 30°, 40°, 50°, 60°, 70°, 80°, 90° (i.e., perpendicular to the housing surface), 100°, 110°, 120°, 130°, 140°, 150°, or any values therebetween. In some embodiments, the minimum port angle 528 is greater than 0°. In some embodiments, the maximum port angle 528 is less than 150°. In some embodiments, the connection port 502 has a 120° range of motion from a port angle of 0° to a port angle of 120°. In some embodiments, the connection port 502 has a 90° range of motion from a port angle of 45° to a port angle of 135°. In some embodiments, the connection port 502 has a 100° range of motion from a port angle of 0° to a port angle of 100°.

In some embodiments, the connection port (or port hub) is rotated and the port angle is changed manually. In some embodiments, the connection port is rotated automatically in response to movement of the computing device housing. In some embodiments, the connection port is rotated automatically in response to movement of a stand supporting the computing device.

In some embodiments, the connection port is rotatable relative to the computing device housing by a friction hinge or between a plurality of detents in a hinge. The connection port is rotatable around a rotational axis by a user applying a torque to the connection port. In some embodiments, the torque is applied directly, such as by a user manually manipulating the connection port or a cable, wire, or peripheral inserted in the port, to change the port angle. In some embodiments, the torque is applied indirectly, such as by contact between the cable, wire, or peripheral inserted in the port contacting a portion of a stand or a surface upon which the device rests when the computing device is moved or rotated. For example, instead of a cable contacting the surface upon which the device rests and being bent into a tight radius turn, the contact with the surface simply rotates the connection port.

Figure 71:
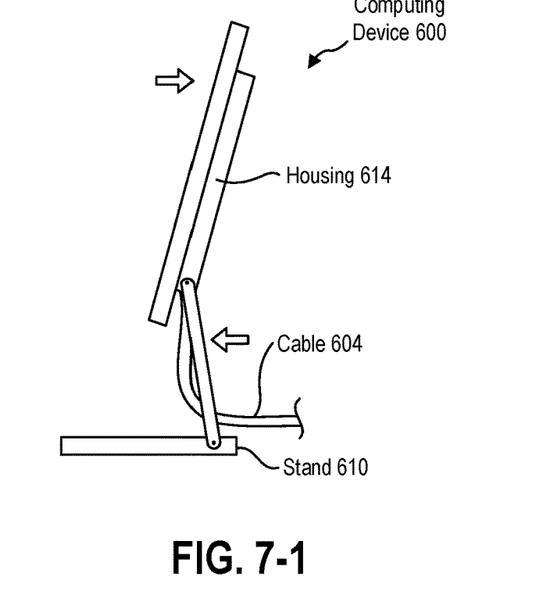
Figure 72:
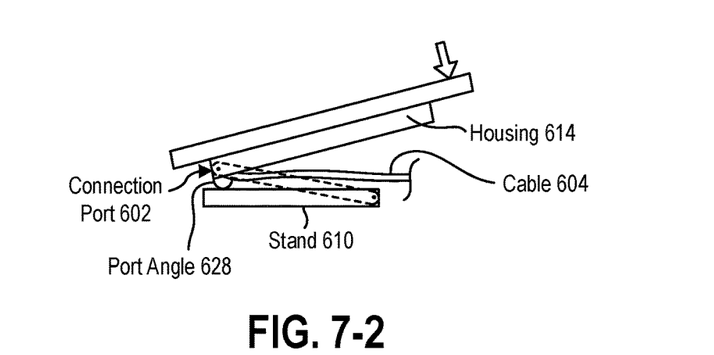

FIGS. 7-1 and 7-2 are side views of an embodiment of a computing device 600 which uses indirect torque to rotate the connection port(s) 502. FIG. 7-1 is a side view of the computing device 600 in a reading posture. The stand 610 supports the housing 614 in an upright position with the cable 604 directed downward from the housing 614 toward the stand 610. As the computing device 600 moves toward a drafting posture, as shown in FIG. 7-2, the contact of the cable 604 with the stand 610 applies a torque to the connection port 602. The torque rotates the connection port 602 relative to the housing 614 to change the port angle 628.

In some embodiments, the port angle changes automatically as the computing device housing moves relative to the direction of gravity. In some embodiments, the connection port is weighted and allowed to rotate on bearings or other low-friction rotational axis. In such embodiments the connection port and an orientation of the connection relative to the direction of gravity remain substantially constant within the range of motion of the connection port while the computing device housing tilts relative to the direction of gravity.

Figure 8:
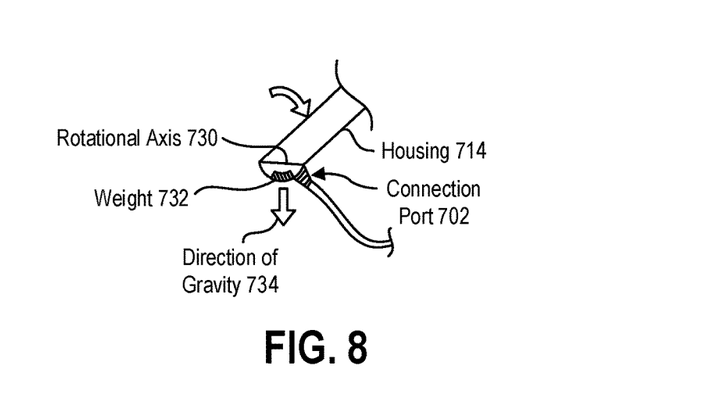
FIG. 8 is a side view of a computing device housing with a weighted connection port, according to at least one embodiment of the present disclosure.

FIG. 8 is a side view of an embodiment of a connection port 702 according to the present disclosure. In some embodiments, the connection port 702 is configured to rotate freely (e.g., with little or no friction around the rotational axis 730 of the connection port 702) relative to the housing 714. In some embodiments, the connection port 702 has a weight 732 thereon that applies a force in the direction of gravity 734 to hold the connection port 702 at a constant angle relative to the direction of gravity 734 as the housing 714 rotates.

In some embodiments, the port angle is automatically changed in response to a movement of the computing device housing relative to part of a stand supporting the computing device. In some embodiments, a gear mechanism or other linkage in the stand of the computing device converts a movement and/or rotation of the housing relative to a part of the stand into a rotation of the connection port. In some embodiments, the gear mechanism includes a chain or belt drive. In some embodiments, the gear mechanism causes the port angle to change proportionately to a movement of the housing relative to a part of the stand. In some embodiments, the gear mechanism includes a cam that cases the port angle to change in a non-linear relationship to the movement of the housing relative to a part of the stand.

Figure 91:
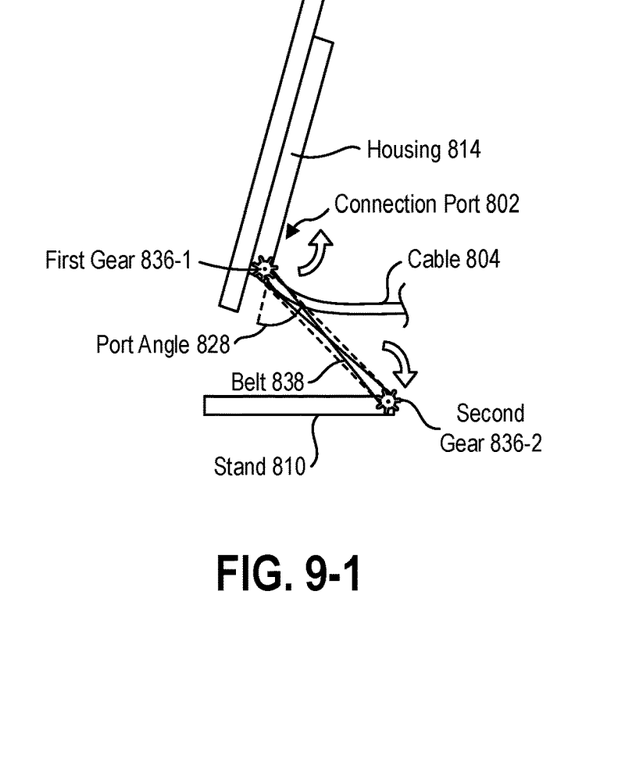
Figure 92:
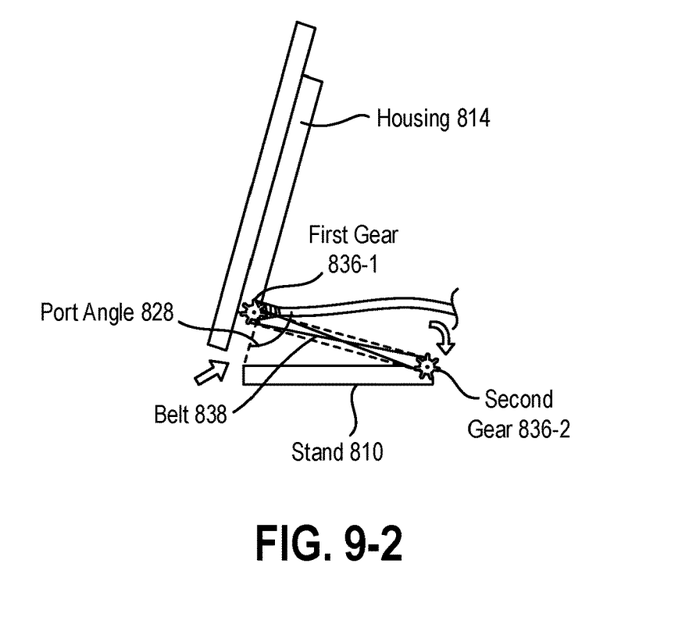

FIGS. 9-1 and 9-2 are side cutaway views illustrating a belt drive system to rotate the connection port 802 based on the relative movement of the housing 814 and stand 810. In some embodiments, a first gear 836-1 (or wheel, drum, etc.) is connected to the connection port 802, and a second gear 836-2 is located in a hinge of the stand 810. In some embodiments, the first gear 836-1 is connected to the second gear 836-2 via a belt 838, which crosses between the first gear 836-1 and second gear 836-2 to reverse a rotational direction of the torque transmitted by the belt 838. For example, a clockwise rotation of the second gear 836-2 is transmitted by the belt 838 to a counterclockwise rotation of the first gear 836-1. Therefore, in some embodiments, as the housing 814 moves downward relative to the stand 810, the movement of the housing 814 relative to the second gear 836-2 caused a rotation of the first gear 836-1 and the connection port 802 to keep the cable 804 clear of the stand 810.

Referring now to FIG. 9-2, as the housing 814 moves downward relative to the stand 810, the belt 838 converts the movement of the housing 814 relative to the second gear 836-2 into a rotation of the first gear 836-1. The rotation of the first gear 836-1 increases the port angle 828. In some embodiments, the first gear 836-1 and the second gear 836-2 are the same size and/or have the same number of teeth, such that the first gear 836-1 and the second gear 836-2 rotate at a 1:1 ratio. In some embodiments, the first gear 836-1 and the second gear 836-2 rotate at a greater than 1:1 ratio. In some embodiments, the first gear 836-1 and the second gear 836-2 rotate at less than a 1:1 ratio.

In some embodiments, the rotation of the connection port is motorized to change the port angle. In some embodiments, a sensor provides posture information to a motor connected to the connection port. The sensor may include an accelerometer that measures an orientation of the housing relative to a direction of gravity. In some embodiments, the sensor is located in a hinge of the stand and/or the housing to measure a rotational position of the hinge. In some embodiments, the motor changes the port angle when the housing approaches contacting the stand and/or a surface upon which the computing device rests. In some embodiments, the motor changes the port angle when the housing is within a distance at which a cable, wire, or peripheral inserted into the connection port approaches contacting the stand and/or a surface upon which the computing device rests.

INDUSTRIAL APPLICABILITY

The present disclosure relates generally to systems and methods for providing moveable input/output (I/O) ports on a computing device. More particularly, the present disclosure relates to rotating I/O ports on a desktop computer, an all-in-one (AIO) computer, laptop computer, hybrid computer, or a display monitor for a desktop computer (collectively "computing devices"). Computing devices include one or more I/O ports to allow the connection of cables or wires between the computing device and a power supply, input devices, video displays, storage devices, audio output components, other peripheral devices, and other external resources, such as network communications. The I/O ports are conventionally located on a rear surface or a bottom surface of the computing device to hide the I/O ports from the user's line of sight during use of the computing device while maintaining accessibility to the I/O ports.

In some embodiments, the computing device containing the I/O ports is moveable relative to a surface upon which the computing device rests. In other embodiments, the computing device containing the I/O port is movable relative to a stand, which supports the computing device on a surface. The movement of the computing device relative to the stand and/or surface upon which the computing device and/or stand rests can pinch, impinge, torque, or otherwise stress the cables or wires connected to the I/O ports. In some embodiments according to the present disclosure, a computing device includes a rotatable I/O port, connection port, or port hub that is moveable relative to a housing of the computing device.

In some embodiments, the rotatable I/O port, connection port, or port hub rotates relative to the housing of the computing device to provide a wired communication to one or more electronic components positioned in the housing. The rotatable I/O port, connection port, or port hub allows the connection of a cable or wire to the computing device with a range of motion relative to a surface of the housing, which limits and/or prevents unintended disconnection of the cable or wire during use and/or limits and/or prevents premature wear and/or failure of the cable, wire, or connection port.

In a conventional computing device that is moveable or rotatable relative to a stand or surface upon which the computing device rests, a connection port or a cable or wire attached to the connection port can be stressed or damages when the cable is pulled away from or laterally relative to the connection port. Additionally, the cable or wire can be stressed or damaged when the cable or wire is bent in small radius curves. A rotatable connection port or port hub can allow the cable or wire to remain in a favorable orientation and/or routing path away from the computing device.

In some embodiments, the connection port is the I/O port of the electronic component in the housing of the computing device. In some embodiments, the connection port is in wired communication with the I/O port of the electronic component. For example, the actual I/O port of the electronic component may be located in the center of a circuit board or near another electronic component that is inconvenient or not possible to access with the cable or wire. In some embodiments, the connection port is located at a corner of the housing, such that rotation of the connection port relative to the housing allows a larger range of motion.

In some embodiments, the connection port has a rotational range of motion greater than 45°. In some embodiments, the connection port has a rotational range of motion greater than 60°. In some embodiments, the connection port has a rotational range of motion greater than 90°. In some embodiments, the connection port has a rotational range of motion greater than 120°.

In some embodiments, connection port is part of a port hub with a plurality of connection ports located therein. In some embodiments, the connection port and/or port hub includes a connection for a power supply port, a network communication port (e.g., an ethernet port), a universal serial bus (USB) port (e.g., USB-A, USB-B, USB-C, mini-iUSB, microUSB), an audio port (e.g., 3.5 millimeter jack), DisplayPort, Thunderbolt port, optical port, or another type of connection port from which a wire, a cable, or another peripheral protrudes when connected. While cables and/or wires are flexible, some peripherals, such as USB memory drives, rigidly project from the connection port when connected.

The connection port(s) is positionable relative to a housing surface such that a cable, wire, or peripheral connected to the connection port(s) forms a port angle with the housing surface. In some embodiments, a minimum or maximum port angle (e.g., one extent of the range of motion) is in a range having an upper value, a lower value, or upper and lower values including any of 0° (i.e., parallel with the housing surface), 10°, 20°, 30°, 40°, 50°, 60°, 70°, 80°, 90° (i.e., perpendicular to the housing surface), 100°, 110°, 120°, 130°, 140°, 150°, or any values therebetween. In some embodiments, the minimum port angle is greater than 0°. In some embodiments, the maximum port angle is less than 150°. In some embodiments, the port has a 120° range of motion from a port angle of 0° to a port angle of 120°. In some embodiments, the port has a 90° range of motion from a port angle of 45° to a port angle of 135°. In some embodiments, the port has a 100° range of motion from a port angle of 0° to a port angle of 100°.

In some embodiments, the connection port (or port hub) is rotated and the port angle is changed manually. In some embodiments, the connection port is rotated automatically in response to movement of the computing device housing. In some embodiments, the connection port is rotated automatically in response to movement of a stand supporting the computing device.

In some embodiments, the connection port is rotatable relative to the computing device housing by a friction hinge or between a plurality of detents in a hinge. The connection port is rotatable around a rotational axis by a user applying a torque to the connection port. In some embodiments, the torque is applied directly, such as by a user manually manipulating the connection port or a cable, wire, or peripheral inserted in the port, to change the port angle. In some embodiments, the torque is applied indirectly, such as by contact between the cable, wire, or peripheral inserted in the port contacting a portion of a stand or a surface upon which the device rests when the computing device is moved or rotated. For example, instead of a cable contacting the surface upon which the device rests and being bent into a tight radius turn, the contact with the surface simply rotates the connection port.

In some embodiments, the port angle changes automatically as the computing device housing moves relative to the direction of gravity. In some embodiments, the connection port is weighted and allowed to rotate on bearings or other low-friction rotational axis. In such embodiments the connection port and an orientation of the connection relative to the direction of gravity remain substantially constant within the range of motion of the connection port while the computing device housing tilts relative to the direction of gravity.

In some embodiments, the port angle is automatically changed in response to a movement of the computing device housing relative to part of a stand supporting the computing device. In some embodiments, a gear mechanism or other linkage in the stand of the computing device converts a movement and/or rotation of the housing relative to a part of the stand into a rotation of the connection port. In some embodiments, the gear mechanism includes a chain or belt drive. In some embodiments, the gear mechanism causes the port angle to change proportionately to a movement of the housing relative to a part of the stand. In some embodiments, the gear mechanism includes a cam that cases the port angle to change in a non-linear relationship to the movement of the housing relative to a part of the stand.

In some embodiments, the rotation of the connection port is motorized to change the port angle. In some embodiments, a sensor provides posture information to a motor connected to the connection port. The sensor may include an accelerometer that measures an orientation of the housing relative to a direction of gravity. In some embodiments, the sensor is located in a hinge of the stand and/or the housing to measure a rotational position of the hinge. In some embodiments, the motor changes the port angle when the housing approaches contacting the stand and/or a surface upon which the computing device rests. In some embodiments, the motor changes the port angle when the housing is within a distance at which a cable, wire, or peripheral inserted into the connection port approaches contacting the stand and/or a surface upon which the computing device rests.

The present disclosure relates to systems and methods for a computing device with moveable connection ports according to at least the examples provided in the sections below:

1. A computing device comprising:
    a housing (e.g., 214, 314, 414, 514, 614, 714, 814) including an outer surface (e.g., housing surface 526);
    an electronic component (e.g., 316) positioned in the housing;

a stand (e.g., 210, 410, 610, 810) that supports the housing; and a connection port (e.g., 202, 302, 402, 502, 602, 702, 802) positioned proximate the outer surface of the housing, wherein the connection port is in wired communication with the electronic component, and the connection port is moveable relative to the housing to change a port angle (e.g., 528, 628, 828) of the connection port relative to the outer surface of the housing when a housing angle of the housing changes relative to the stand.

2. The computing device of section 1, wherein the change in port angle reduces crimping of an external cable (e.g., 204, 404, 504, 604, 804) connected to the connection port.

3. The computing device of section 1, wherein the connection port is in wired communication with an input/output (I/O) port of the electronic component.

4. The computing device of section 1, wherein the connection port is the I/O port of the electronic component.

5. The computing device of any preceding section, wherein the connection port is movable through a range of motion (e.g., 524) greater than 100° relative to the outer surface of the housing.

6. The computing device of any preceding section, wherein the connection port is a power supply port.

7. The computing device of any preceding section, wherein the connection port is an optical cable port.

8. The computing device of any preceding section, wherein the connection port is a universal serial bus (USB) port.

9. The computing device of any preceding section, further comprising a port hub (e.g., 320, 420) that includes a plurality of types of ports, wherein the connection port is part of the port hub, and wherein the port hub is movable relative to the housing to change port angles of the port hub relative to the outer surface of the housing when the housing angle of the housing changes relative to the stand.

10. The computing device of any preceding section, further comprising a gear mechanism (e.g., 836-1, 836-2) that translates a first movement of the housing relative to the stand into a second movement of the connection port relative to the housing.

11. The computing device of section 9, wherein a rotational component of the second movement is greater than a rotational component of the first movement.

12. The computing device of any preceding section, further comprising a weighted orientation mechanism (e.g., weight 732) that translates a first movement of the housing relative to a direction of gravity (e.g., 734) into a second movement of the connection port relative to the housing when the housing changes orientation relative to the direction of gravity.

13. The computing device of any preceding section, further comprising a friction hinge that retains the connection port at the angle relative to the outer surface of the housing when no additional outside force is applied to the connection port relative to the outer surface of the housing.

14. The computing device of any preceding section, wherein the housing further includes a display (e.g., 218), the display being movable relative to the stand with the housing.

15. The computing device of any preceding section, wherein the stand rotates the housing based at least partially on a translation of the housing relative to a portion of the stand, and the connection ports rotate relative to the housing based at least partially on the rotation and translation of the housing relative to the stand.

16. The computing device of any preceding section, further comprising an electric motor that changes the port angle based at least partially on a relative position of the housing to the stand.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computing device comprising:
a housing including an outer surface;

an electronic component positioned in the housing;

a stand that supports the housing; and a connection port positioned proximate the outer surface of the housing, wherein the connection port is in electrical communication with the electronic component, and the connection port is moveable relative to the housing to change a port angle of the connection port relative to the outer surface of the housing when a housing angle of the housing changes relative to the stand, wherein the connection port is movable through a range of motion greater than 100° relative to the outer surface of the housing.

2. The computing device of claim 1, wherein the change in port angle reduces crimping of an external cable connected to the connection port.

3. The computing device of claim 1, wherein the connection port is in wired communication with an input/output (I/O) port of the electronic component.

4. The computing device of claim 1, wherein the connection port is the I/O port of the electronic component.

5. The computing device of claim 1, wherein the connection port is a power supply port.

6. The computing device of claim 1, wherein the connection port is an optical cable port.

7. The computing device of claim 1, wherein the connection port is a universal serial bus (USB) port.

8. The computing device of claim 1, further comprising a port hub that includes a plurality of types of ports, wherein the connection port is part of the port hub, and wherein the port hub is movable relative to the housing to change port angles of the port hub relative to the outer surface of the housing when the housing angle of the housing changes relative to the stand.

9. The computing device of claim 1, further comprising a weighted orientation mechanism that translates a first movement of the housing relative to a direction of gravity into a second movement of the connection port relative to the housing when the housing changes orientation relative to the direction of gravity.

10. The computing device of claim 1, further comprising a friction hinge that retains the connection port at the angle relative to the outer surface of the housing when no additional outside force is applied to the connection port relative to the outer surface of the housing.

11. The computing device of claim 1, wherein the housing further includes a display, the display being movable relative to the stand with the housing.

12. The computing device of claim 1, wherein the stand rotates the housing based at least partially on a translation of the housing relative to a portion of the stand, and the connection ports rotate relative to the housing based at least partially on the rotation and translation of the housing relative to the stand.

13. The computing device of claim 1, further comprising an electric motor that changes the port angle based at least partially on a relative position of the housing to the stand.

14. The computing device of claim 1, wherein the connection port is movable through a range of motion greater than 100° relative to the outer surface of the housing.

15. The computing device of claim 1, further comprising a gear mechanism that translates a first movement of the housing relative to the stand into a second movement of the connection port relative to the housing.

16. The computing device of claim 15, wherein a rotational component of the second movement is greater than a rotational component of the first movement.

* * * * *